3,110,733
9α-HYDROXY-A-NORANDROSTENES
Frank L. Weisenborn, Middlebush, and Charles John Sih, New Brunswick, N.J., assignors to Olin Mathieson Chemical Corporation, New York, N.Y., a corporation of Virginia
No Drawing. Filed Jan. 11, 1960, Ser. No. 1,404
5 Claims. (Cl. 260—586)

This invention relates to, and has for its object, the provision of 9α-hydroxy-A-norandrostenes having the formula:

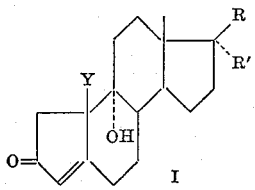

wherein Y is hydrogen or methyl, R is hydrogen, methyl or ethyl, R' is hydroxy or acyloxy (particularly the acyloxy radical of a hydrocarbon carboxylic acid of less than ten carbon atoms, as exemplified by the lower fatty acids), or together R and R' is keto (oxo). Examples of such steroids include 9α-hydroxy-A-nortestosterone, 9α-hydroxy - 17α - methyl-A-nortestosterone, 9α-hydroxy-17α-ethyl - A - nortestosterone, 9α-hydroxy-A-19-bis-nortestosterone, 9α-hydroxy-17α-methyl-A-19-bis-nortestosterone, 9α - hydroxy - 17α - ethyl - A - 19 - bis - nortestosterone, and 17-esters of each of these compounds, A-nor-Δ³-androstene-9α-ol-2,17-dione, and A-19-bis-nor-Δ³- androstene-9α-ol-2,17-dione.

The compounds of this invention can be prepared by the method of this invention which comprises subjecting a Δ³-A-norandrostene-2-one substrate to the action of enzymes of the microorganism *Nocardia restrictus* under oxidizing conditions. The hydroxylation can be best effected by either including the steroid in an aerobic culture of *Nocardia restrictus* or by bringing together in an aqueous medium, the steroid, air and enzymes of non-proliferating cells of the microorganism.

Suitable substrates for this process are compounds of the formula:

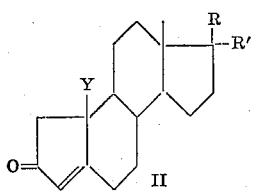

wherein R, R' and Y are as hereinbefore defined. The starting substrates can be prepared as disclosed in copending application No. 766,363, filed October 9, 1958, by a method which comprises heating a compound of the Formula III

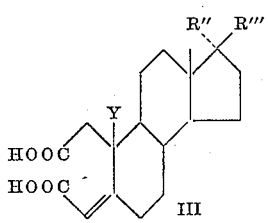

wherein Y is hydrogen or methyl, R" is hydrogen, methyl, or ethyl, and R''' is hydroxy or acyloxy, to a temperature of at least about 200° C. (preferably about 220° C. to about 270°, and optimally about 250° C.). The reaction is preferably conducted by dissolving the diacid III in an acid anhydride. When the reaction is conducted in an acid anhydride solvent, the product initially formed is the ester of a compound of Formula II (i.e., R' is acyloxy) with the acyl radical of the anhydride solvent. Thus, when 2,3-seco-testosterone-2,3-dioic acid (Y is methyl, R" is hydrogen, R''' is hydroxy) is heated in an acetic anhydride solvent, A-nortestosterone 17-acetate is recovered as the major product. Any acid anhydride wherein the diacid III is soluble may be used as a solvent in this process, the choice of solvent determining the acyl value for R' in the compound of Formula II. Among the suitable acid anhydrides may be mentioned the anhydrides of the lower fatty acids (e.g., acetic and propionic anhydride). The diacide III employed above may be prepared by the general method disclosed by Weisenborn et al. in J.A.C.S., 76, 552 (1954). The diacids include 2,3-seco-testosterone-2,3-dioic acid, 17α-methyl-2,3-seco-testosterone-2,3-dioic acid, 17α-ethyl-2,3-seco-testosterone-2,3-dioic acid, 19-nor-2,3-seco-testosterone-2,3-dioic acid, 17α-methyl-19-nor-2,3-seco-testosterone - 2,3 - dioic acid, and 17α-ethyl-19-nor-2,3-seco-testosterone-2,3-dioic acid.

To prepare the free alcohol starting substrates (e.g., A-nortestosterone), the esters initially formed (compounds of Formula II wherein R' is acyloxy) are hydrolyzed in the usual manner, as by treatment with a base such as sodium hydroxide. The free alcohols (compounds of Formula II wherein R' is hydroxy) can then be esterified in the usual manner by treatment with any desired acid anhydride or acyl halide, the reaction preferably being carried out in the presence of an organic base such as pyridine or collidine. Among the suitable esterifying reagents may be mentioned the acid anhydrides and acyl chlorides of hydrocarbon carboxylic acids of less than ten carbon atoms, such as lower alkanoic acids, monocyclic aromatic carboxylic acids (e.g., benzoyl chloride), monocyclic aralkanoic acids (e.g., phenacetyl chloride), lower alkenoic acids, cycloalkane carboxylic acids (e.g., cyclohexane carbonyl chloride), and cycloalkene carboxylic acids.

To prepare the 17-keto starting substrates (compounds of Formula II wherein R and R' is ketone, as exemplified by A-nor-Δ³-androstene-2,17-dione), the free 17-hydroxy steroids prepared above (i.e., A-nortestosterone and A-19-bis-nortestosterone) are oxidized, as by treatment with a hexavalent chromium compound (e.g., chromic acid), to convert the 17-hydroxy group to an oxo radical.

In general, the conditions for culturing *N. restrictus* for the purposes of this invention are (except for the inclusion of the steroid to be converted) the same as those for culturing various other molds for the production of antibiotics, i.e., the microorganism is aerobically grown in contact with (in or on) a suitable fermentation medium. A suitable medium essentially comprises a nitrogenous substance and a source of carbon and energy. The latter may be a carbohydrate (such as sucrose, molasses, glucose, maltose, starch or dextrin), a fatty acid, a fat and/or the steroid to be converted. Preferably, however, the medium includes an assimilable source of carbon and energy in addition to the steroid.

The source of nitrogenous factors may be natural (e.g., soybean meal, corn steep liquor, meat extract and/or distillers solubles) or synthetic (i.e., composed of simple, synthesizable organic or inorganic compounds such as ammonium salts, alkali nitrates, amino acids or urea).

An adequate sterile air supply should be maintained during fermentation, for example by the conventional methods of exposing a large surface of the medium to air or by utilizing submerged aerated culture techniques. The steroid may be added to the culture during the incubation period, or included in the medium prior to sterilization or inoculation. The preferred range of concentration of the steroid in the culture is about 0.01 to 0.1%. The culture period may vary considerably, the range of about six to ninety-six hours being feasible but not limiting.

The fermentation process yields the compound of this invention of Formula I wherein R and R' constitute an oxo-group except when the substrate is a 17-methyl or 17-ethyl-17-oxy-steroid, in which event, the fermentation process yields the corresponding 17-oxy-9α-hydroxylated product which can be separated from the fermentation broth and thereafter purified by conventional procedures. In the event a 17-hydroxylated product is obtained, it can be converted to a 17-acyloxy derivative by conventional esterification procedures, such as the procedure outlined supra; for the preparation of 17-acyloxy derivatives of Formula II. The 17-oxo-steroidal products can if desired be converted to their 17-oxy-derivatives by selective reduction of the 17-oxo-group with sodium borohydride in a solvent such as methanol. In this manner 9α-hydroxy-Δ³-A-nor-androstene-2,17-dione is converted to 9α-hydroxy-A-nortestosterone.

The compounds of this invention corresponding to Formula I are pharmacologically active A-nor steroids having anti-androgenic activity and thus can be administered in the treatment of hyperandrogenic acne, i.e., the acne condition resulting from the over abundance of androgen such as testosterone. They may be administered for this purpose either topically or systemically being formulated for such administration in conventional ointments or injectable liquid carriers.

The following examples serve to more fully illustrate this invention (all temperatures being in centigrade):

*Example 1.—Preparation of 9α-Hydroxy-Δ³-A-Norandrostene-2,17-Dione*

Surface growth from a two-week old culture of *Nocardia restrictus* (Waksman Collection No. 545, Rutgers University, New Brunswick, New Jersey) grown on agar is suspended in 5 ml. of 0.85% saline solution. One ml. portions of this suspension are used to inoculate 500 ml. flasks containing 100 ml. of medium of the following composition:

| | |
|---|---|
| Dextrose | gms__ 10 |
| Yeast extract | gms__ 2.5 |
| Corn steep liquor | gms__ 6 |
| $NH_4H_2PO_4$ | gms__ 3 |
| $CaCO_3$ | gms__ 2.5 |
| Soybean oil | gms__ 2.2 |
| Distilled water, q.s. | liter__ 1 |

The inoculated flasks are incubated at 25° on a rotary shaker (set at 280 cycles per minute and a 2 inch radius) for 24 hours after which time a 5% by volume transfer of the contents of each flask is made to each of twenty 500 ml. flasks containing 100 ml. of the same medium. To each of these flasks is then added 0.25 ml. of a 200 mg. per ml. solution of A-nortestosterone in N,N-dimethylformamide resulting in the final concentration of 500 gamma per ml. The steroid containing medium is fermented at 25° on a rotary shaker (set at 280 cycles per minute and a 2 inch radius). After forty-eight hours of fermentation under these conditions, the culture broths from each flask are harvested by vacuum filtration directly through a Seitz clarifying pad. The combined filtrate amounting to 2300 ml. of material is extracted three times with 700 ml. portions of chloroform. The combined chloroform extracts are dried under sodium sulfate and evaporated to dryness under vacuum. 1.17 grams of the crystalline residue is recrystallized from methanol in ethyl acetate to give about 743 mgs. of pure 9α-hydroxy-Δ³-A-norandrostene-2,17-dione having the following characteristics: M.P. about 281–283°, $[\alpha]_D +76°$ (chloroform) $\lambda_{max.}^{alc.}$ 233 mμ (log ε = 4.16), $\lambda_{max.}^{Nujol}$ 2.89 μ, 5.81 μ, 5.90 μ, 5.96 μ, 6.19 μ.

Anal.—Calc'd for $C_{18}H_{24}O_3$: C, 74.97; H, 8.39. Found: C, 74.96; H, 8.13.

*Example II.—Preparation of 9α-Hydroxy-17α-Methyl-A-Nortestosterone*

Following the procedure of Example I, 17α-methyl-A-nortestosterone is added to a proliferating culture of *N. restrictus* (Waksman Collection No. 545). Upon fermentation, harvest and extraction, there is obtained 9α-hydroxy-17α-methyl-A-nortestosterone.

*Example III—Preparation of 9α-Hydroxy-17α-Methyl-A-Nortestosterone 17-Acetate*

A solution of 100 mg. of 17α-methyl-9α-hydroxy-A-nortestosterone in 5 ml. of pyridine and 2 ml. of acetic anhydride is allowed to stand at room temperature for 24 hours. The solution is then treated with 25 ml. of 5% sodium carbonate solution and reacted with ether. Evaporation of the ether extracts gives 9α-hydroxy-A-nortestosterone 17-acetate.

Similarly, by substituting other acylating agents for the acetic anhydride in the procedure of Example III, the corresponding 17-ester derivatives are formed.

*Example IV.—Preparation of 9α-Hydroxy-Δ³-A,19-Bis-Norandrostene-2,17-Dione*

Following the procedure of Example I identical except for the use of Δ³-A,19-bis-norandrostene-2,17-dione as the steroid substrate, there is obtained as the product 9α-hydroxy-Δ³-A,19-bis-norandrostene-2,17-dione.

*Example VI.—Preparation of 9α-Hydroxy-A-Nortestosterone*

9α-hydroxy-A-norandrostene-2,17-dione (100 mg.) dissolved in 15 ml. of methanol is treated with 1.5 molar equivalents of sodium borohydride at 0° for one hour. The solution is neutralized with a few drops of acetic acid and evaporated to dryness in vacuo. The residue is taken up in chloroform, and the chloroform solution washed with water, dried over sodium sulfate, and concentrated. This product is then chromatographed on Merck's acid-washed alumina. Elution with increasing amounts of chloroform-benzene mixture gives 9α-hydroxy-A-nortestosterone which is recrystallized from ethyl acetatehexane.

This invention may be variously otherwise embodied within the scope of the appended claims.

What is claimed is:

1. A compound of the formula

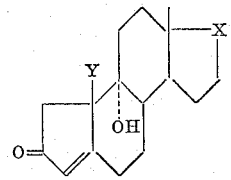

wherein Y is selected from the group consisting of hydrogen and methyl; X is selected from the group consisting of

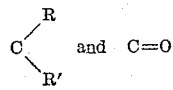

R is selected from the group consisting of hydrogen, methyl and ethyl; and R' is selected from the group consisting of hydroxy and the acyloxy radical of a hydrocarbon carboxylic acid of less than 10 carbon atoms.

2. 9α-hydroxy-A-nortestosterone.

3. 9α-hydroxy-17α-methyl-A-nortestosterone.

4. 9α-hydroxy-Δ,19-bis-nortestosterone.
5. 9α-hydroxy-A-nor-Δ³-androstene-2,17-dione.

References Cited in the file of this patent

UNITED STATES PATENTS

| | | |
|---|---|---|
| 2,810,758 | Johnson et al. | Oct. 22, 1957 |
| 2,832,805 | Hoehn et al. | Apr. 29, 1958 |
| 2,863,806 | Dulaney et al. | Dec. 9, 1958 |
| 2,872,381 | Fried et al. | Feb. 3, 1959 |
| 3,005,017 | Lerner et al. | Oct. 17, 1961 |
| 3,005,018 | Weisenborn et al. | Oct. 17, 1961 |
| 3,005,028 | Thoma et al. | Oct. 17, 1961 |

OTHER REFERENCES

Weisenborn et al.: Jour. Am. Chem. Soc., vol 81, pages 1960–4 (1959).